United States Patent [19]
Backes et al.

[11] Patent Number: 4,974,275
[45] Date of Patent: Dec. 4, 1990

[54] METHOD OF MANUFACTURE OF SNOWSHOES

[76] Inventors: James G. Backes, 17 Oak St. West, Osakis, Minn. 56360; Barney J. Klecker, 5374 Maple Rich Ct., Minnetonka, Minn. 55343

[21] Appl. No.: 445,419

[22] Filed: Dec. 4, 1989

[51] Int. Cl.⁵ .................... A43D 9/00; A43D 11/00; A43D 21/00
[52] U.S. Cl. .................. 12/142 R; 12/142 P; 36/122; 36/123
[58] Field of Search .............. 12/142 P, 142 R, 146 B; 36/122, 123

[56] References Cited

U.S. PATENT DOCUMENTS

| | | | |
|---|---|---|---|
| 1,052,139 | 2/1913 | Emack | 36/122 |
| 1,630,041 | 5/1927 | Vose | 36/122 |
| 2,097,249 | 10/1937 | Keene | 36/122 |
| 2,615,260 | 10/1952 | Paden | 36/122 |
| 3,299,541 | 1/1967 | Snyder | 36/122 |
| 3,638,333 | 2/1972 | Sprandel | 36/122 |
| 3,645,833 | 2/1972 | Figge | 161/57 |
| 3,649,401 | 3/1972 | Gunnerson | 156/180 |
| 3,673,713 | 7/1972 | Fedewitz | 36/122 |
| 3,755,054 | 8/1973 | Medney | 161/57 |
| 3,772,126 | 11/1973 | Myers | 156/434 |
| 3,932,247 | 1/1976 | Oshima | 156/148 |
| 4,041,621 | 8/1977 | Anderson | 36/122 |
| 4,041,622 | 8/1977 | Schonbrun | 36/124 |
| 4,045,889 | 9/1977 | Woolworth | 36/122 |
| 4,347,287 | 8/1982 | Lewis et al. | 428/378 |
| 4,395,029 | 7/1983 | Davis et al. | 269/57 |

Primary Examiner—Paul T. Sewell
Assistant Examiner—BethAnne Cicconi
Attorney, Agent, or Firm—Peterson, Wicks, Nemer & Kamrath

[57] ABSTRACT

A recreational snowshoe and its method of manufacture are disclosed of the type where a single, homogenous, rigid mass is formed by hardening first and second strands of fiberglass roving impregnated with resin woven to define a frame and webbing. The strands are woven between a first series of removable, spaced pins projecting from the peripheral surface of a jig and around the peripheral surface and across the jig. The webbing includes bracing extending between the tip and rear portions of the snowshoe generally parallel to and spaced from the frame of the sides of the central portion of the snowshoe. The tip portion is upturned such that the bracing is elevated from the sides of the frame, with the bracing been drawn toward the plane of the central portion by lateral bracing to provide a cushion effect. Triangular shaped cleats are formed with the frame by initially weaving the strands around a second series of pins spaced vertically below and intermediate the first series of pins to form V-shaped depressions. The jig and woven strands are heated to set the resins, with spacer and indentation bars positioned thereon for creating binding and foot engagement locations.

13 Claims, 3 Drawing Sheets

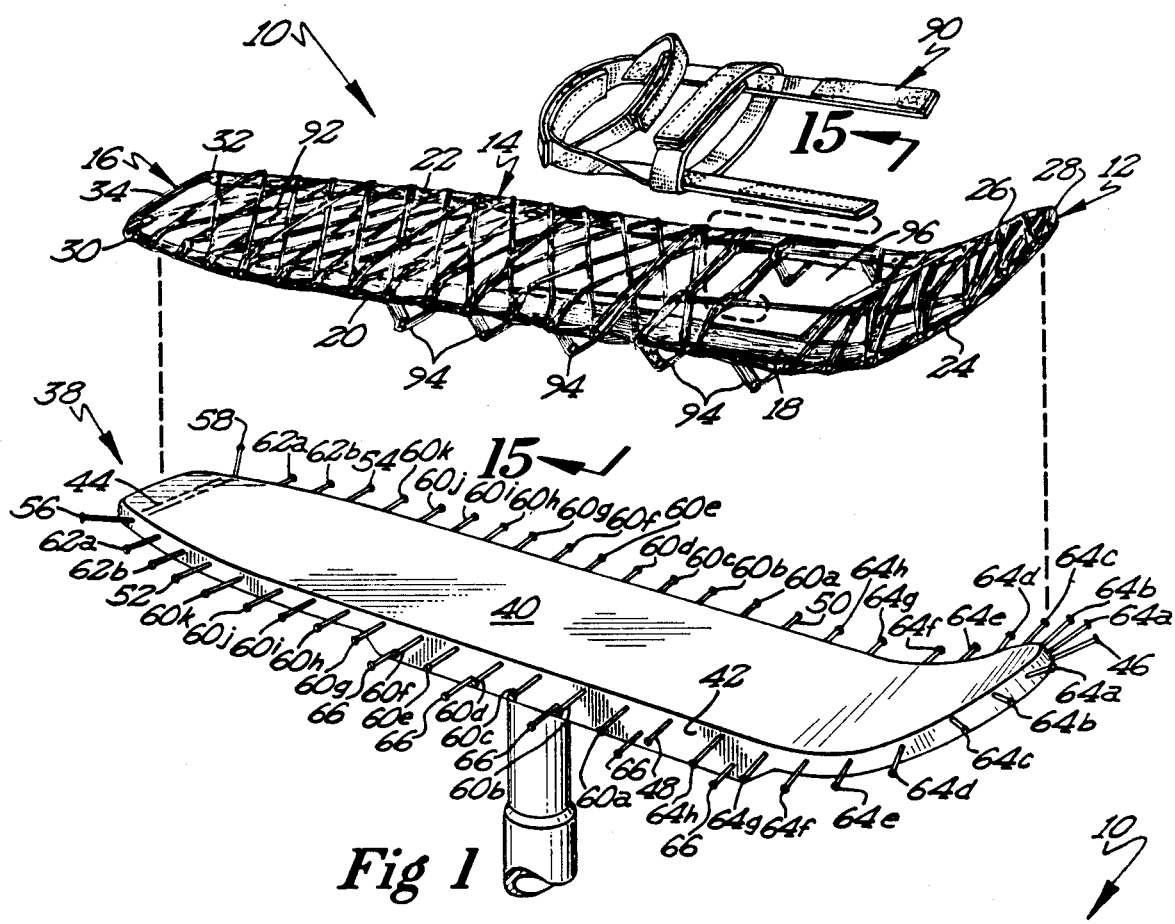
Fig 1
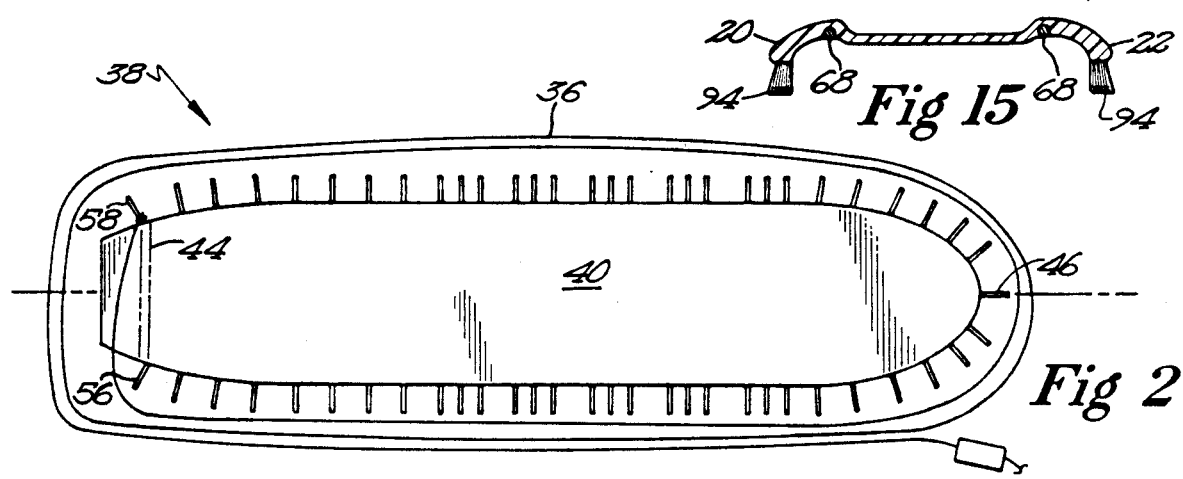
Fig 15
Fig 2
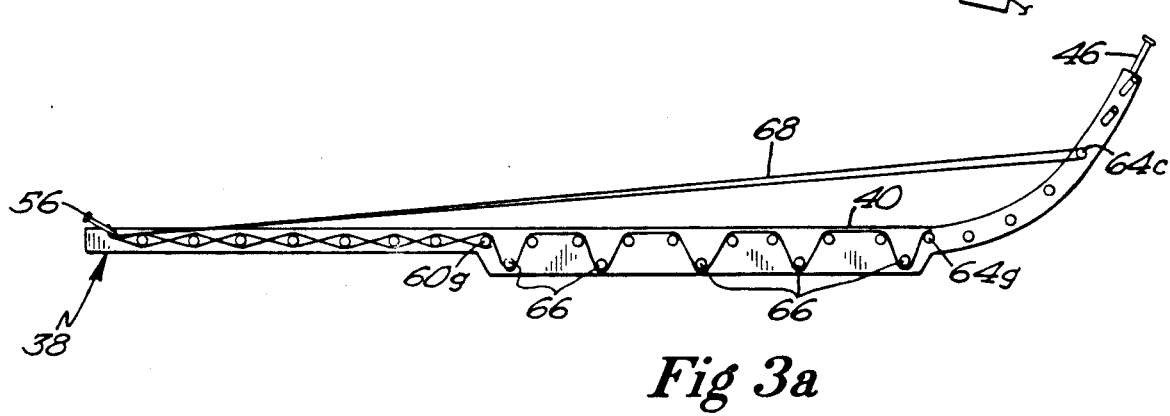
Fig 3a

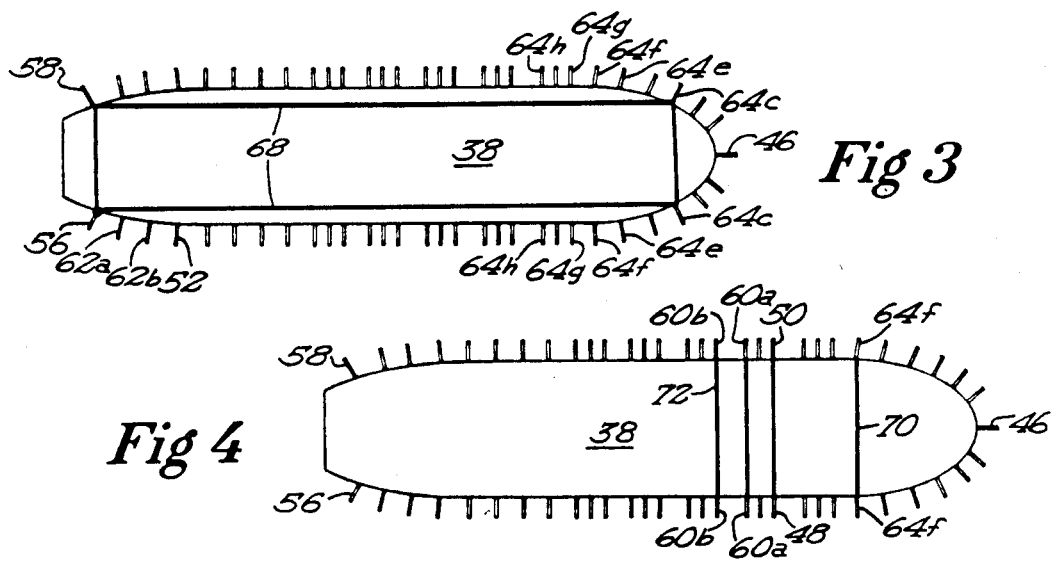
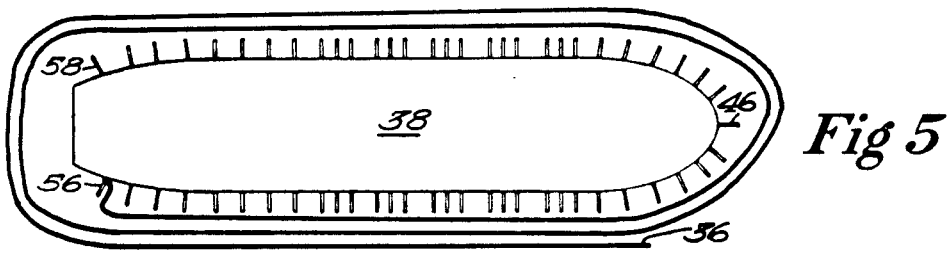
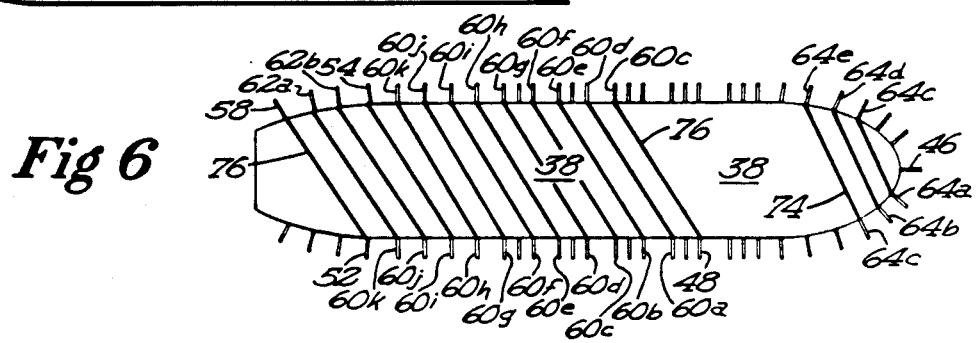
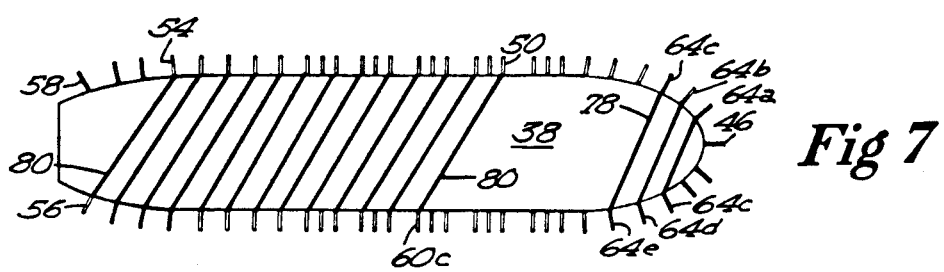
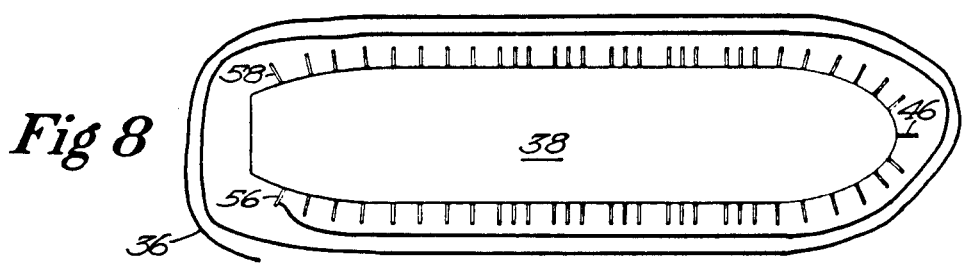

N 4,974,275

METHOD OF MANUFACTURE OF SNOWSHOES

BACKGROUND

The present invention generally relates to snowshoes and their method of manufacture.

With the increasing awareness for the need for exercise and fitness for good health, fitness programs include a variety of activities such as walking to stress the cardiovascular system. However, inclement winter weather hampers outdoor activity due to icy and snowy conditions. Further, it is desirable to perform such activities in a natural setting away from city streets, sidewalks, and like artificial paths where snow conditions may restrict passage. Furthermore, a need exists for activities which stress the cardiovascular system but reduce the pounding and jarring on the feet, ankles and legs as in running.

Snowshoeing is an activity which meets these criteria for fitness programs. However, snowshoeing has not achieved the acclamation it should have in fitness programs. One of the reasons that snowshoeing has not achieved its rightful position in such fitness programs is the deficiencies arising from the equipment available. Specifically, traditional wood and rawhide snowshoes are quite expensive and require considerable maintenance. Particularly, the wood frame must be varnished periodically and proper care must be taken of the rawhide webbing to prevent hardening, cracking, and tearing from contact with the elements including snow, ice, and moisture when in use and air while in storage. Snowshoes formed of plastic material have been available. Although maintenance is reduced, plastic snowshoes are brittle, especially when utilized under cold conditions, are subject to cracking and do not allow flexing to cushion the user's legs during use as do traditional snowshoes.

Thus, a need exists for snowshoes which obtain the advantages of traditional snowshoes while eliminating the maintenance and cost requirements thereof and without acquiring the deficiencies inherent in plastic snowshoes.

SUMMARY

The present invention solves this need and other problems in the field of snowshoes by providing, in its most preferred form, a snowshoe comprising at least a first continuous strand of fiberglass roving impregnated with resin and woven to define a frame and webbing for the snowshoe and hardened into a single, homogenous, rigid mass.

In another aspect of the present invention, a method of forming a snowshoe is provided comprising the steps of weaving at least a first continuous strand of fiberglass roving impregnated with resin between a first series of spaced-apart strand supporting pins projecting outwardly of the peripheral surface of a jig around the peripheral surface and between said pins across the jig to form a frame and webbing for the snowshoe, allowing the resin to set to form the woven strand into a single, homogenous, rigid mass, and removing the rigid mass from the jig.

It is thus an object of the present invention to provide a novel snowshoe.

It is further an object of the present invention to provide a novel method of forming a snowshoe.

It is further an object of the present invention to provide such a novel snowshoe which requires no maintenance.

It is further an object of the present invention to provide such a novel snowshoe which is practically indestructible under normal use conditions.

It is further an object of the present invention to provide such a novel snowshoe which is lightweight.

It is further an object of the present invention to provide such a novel snowshoe which provides a cushion effect to the feet, ankles, knees, and legs of the user.

It is further an object of the present invention to provide such a novel snowshoe having bracing spaced from and parallel to the longitudinal sides of the frame.

It is further an object of the present invention to provide such a novel snowshoe having a wood looking grain.

It is further an object of the present invention to provide such a novel snowshoe including integral triangular shaped cleats.

It is further an object of the present invention to provide such a novel snowshoe having a unique configuration.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows an exploded perspective view of a snowshoe and a manufacturing jig according to the preferred teachings of the present invention.

FIGS. 2–14 show diagrammatic views illustrating the steps of manufacture of the snowshoe of FIG. 1., FIG. 15 shows a cross sectional view of the snowshoe of FIG. 1 according to section line 15—15 of FIG. 1.

Figure 9:
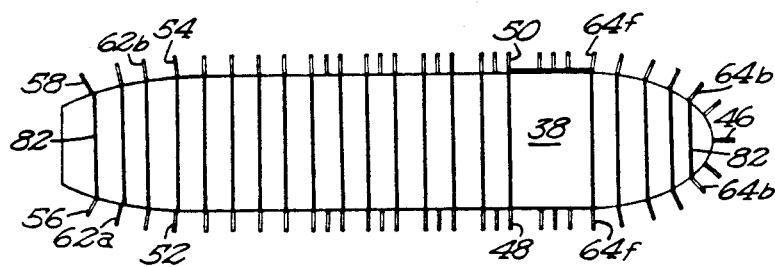
Figure 10:
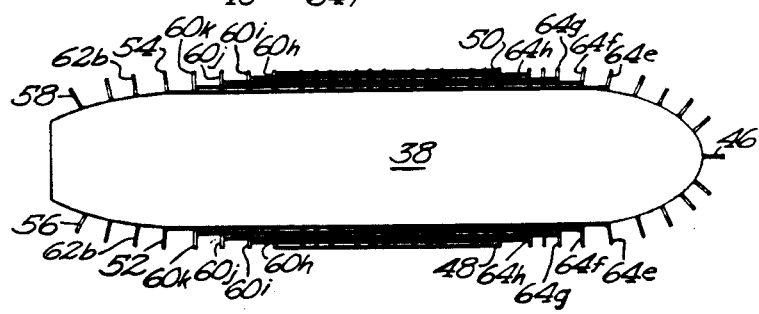
Figure 11:
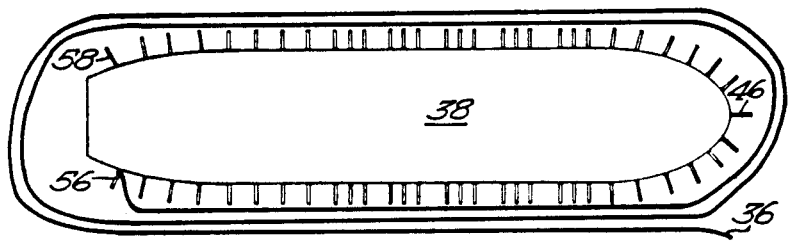
Figure 12:
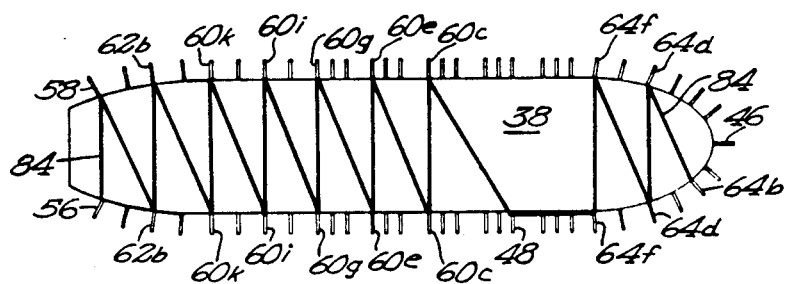
Figure 13:
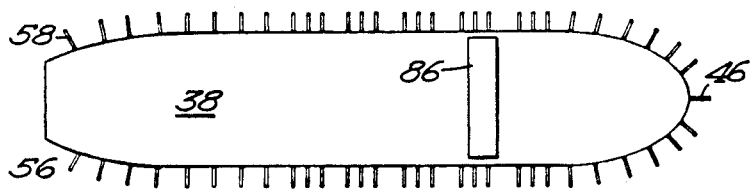
Figure 14:
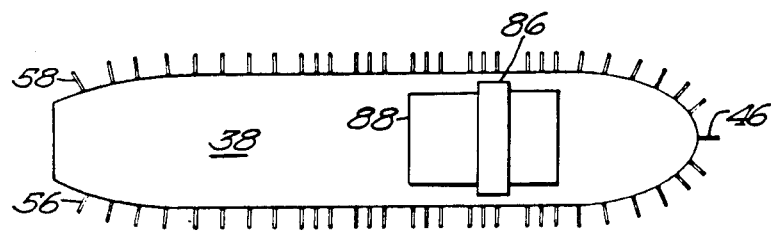

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "first", "second", "vertical", "horizontal", "central", "upper", "side", "end", and similar terms are used herein, it should be understood that these terms have reference only to the structure shown in the drawings as it would appear to a person viewing the drawings and are utilized only to facilitate describing the invention.

DESCRIPTION

A snowshoe and its method of manufacture are shown in the drawings, with the snowshoe being generally designated 10. Snowshoe 10 has a generally unique configuration and includes an upturned tip portion 12, a central portion 14 and a rear portion 16. In the most preferred form, snowshoe 10 for individuals who are five feet eight inches tall and taller and/or who are in excess of 150 pounds has a total length in the order of 34½ inches, a width of 9¾ inches, and a weight with binding 90 in the order of 2 pounds 5 ounces per snowshoe 10. It can be appreciated that snowshoe 10 can be made proportionately larger or smaller to perform for individuals of various heights and/or weights length of central portion 14 of snowshoe 10 constitutes approximately 18 inches or 53%, with the length of the tip portion 12 constituting approximately 10 inches or 30%, and with the length of the rear portion 16 constituting approximately 6 inches or 17%. Snowshoe 10 includes a frame portion 18. The sides 20 and 22 of frame portion 18 of central portion 14 are in a spaced, generally parallel relation. The sides 24 and 26 of frame portion 18 of tip portion 12 extend contiguously from sides 20 and 22 in an arcuate manner forwardly and upwardly and integrally interconnect together at the forward point 28 of snowshoe 10. The sides 30 and 32 extend contiguously at a relatively small angle in the order of 15° from sides 20 and 22. The rear ends of sides 30 and 32 are integrally interconnected to laterally extending rear side 34 which is generally perpendicular to sides 20 and 22 and the longitudinal axis of snowshoe 10.

In the most preferred form, snowshoe 10 is formed by continuously weaving two strands of fiberglass roving 36 around a jig 38 formed in the most preferred form of high density polyethylene. Specifically, jig 38 has a top surface 40 and a peripheral, side surface 42 which are interconnected together by relatively arcuate or rounded corners. The side surface 42 of jig 38 has a shape complementary to the inside surfaces of sides 20, 22, 24, 26, 30 and 32 and extends beyond side 34. Top surface 40 includes a groove 44 corresponding to side 34. A removable, strand supporting pin 46 extends from jig 38 projecting outwardly generally perpendicularly from side surface 42 at point 28, removable, strand supporting pins 48 and 50 extend from jig 38 projecting horizontally outwardly generally perpendicularly from side surface 42 at the interconnection of sides 20 and 22 with sides 24 and 26, removable, strand supporting pins 52 and 54 extend from jig 38 projecting horizontally outwardly generally perpendicularly from side surface 42 at the interconnection of sides 20 and 22 with sides 30 and 32, and removable, strand supporting pins 56 and 58 extend from jig 38 projecting horizontally outwardly generally perpendicularly from side surface 42 at the interconnection of sides 30 and 32 with side 34. Removable, strand supporting pins 60 project horizontally outwardly generally perpendicularly from side surface 42 of jig 38 corresponding to sides 20 and 22 of snowshoe 10 at spaced-apart locations between pins 48 and 50 and pins 52 and 54, with the spacing between pins 60 being generally equal. In the preferred form, eleven pins 60 are provided on each side of jig 38 and are spaced in the range of 1½ inches from each other. Removable, strand supporting pins 62 project horizontally outwardly generally perpendicularly from side surface 42 of jig 38 corresponding to sides 30 and 32 of snowshoe 10 at spaced-apart locations between pins 52 and 54 and pins 56 and 58, with the spacing between pins 62 increasing from pins 56 and 58 to pins 52 and 54. In the preferred form, two pins 62 are provided on each side of jig 38. Removable, strand supporting pins 64 project outwardly generally perpendicularly from side surface 42 of jig 38 corresponding to sides 24 and 26 of snowshoe 10 at spaced-apart locations between pin 46 and pins 48 and 50, with the spacing between pins 64 increasing from pin 46 to pins 48 and 50. In the preferred form, eight pins 64 are provided on each side of jig 38. In the preferred form, the first series of pins 46, 48, 50, 52, 54, 56, 58, 60, 62, and 64 extend the same vertical distance down side surface 42 from top portion 40. A second series of a plurality of pins 66 are provided located intermediate alternating pairs of pins 48, 50, 60, and 64 at the same vertical distance down side surface 42 from top surface 40 which is longer than the vertical distance of pins 46, 48, 50, 52, 54, 56, 58, 60, 62, and 64. In the preferred form, five pins 66 are provided on each of jig 38 along a length corresponding to the location of the abutment of snowshoe 10 with the foot of the wearer.

During manufacture, fiberglass roving is pulled through a bath of resin and colorant to form strands 36. Strands 36 are pulled through a high density polyethylyne filter to filter out excess resin to keep the excess resin from running, with the polyethelyene filter resisting wear from strands 36 rubbing thereon. Frame portion 18 is initially created by double weaving strands 36 a multiple times around the perimeter of jig 38 and particularly peripheral surface 42 alternatively over and under the pins 46, 48, 50, 52, 54, 56, 58, 60, 62, and 64 and in the preferred form around pins 66 forming V-shaped depressions. It should be appreciated that with each revolution, strands 36 should be changed between over and under a particular pin 46, 48, 50, 52, 54, 56, 58, 60, 62, or 64. For purposes of explanation, the free end of strands 36 may be wrapped around pin 58 and then over top surface 40 in groove 44 to pin 56 and then counterclockwise around the perimeter of jig 38 eight revolutions.

Longitudinal bracing 68 extending generally parallel to sides 20 and 22 may next be formed for snowshoe 10. In the preferred form, bracing 68 is formed by weaving two and one half revolutions across jig 38 from pin 56 to the pin 64c of equal lateral position which in the preferred form is the third pin 64c from pin 46, two and one half revolutions between pin 56 and the fifth pin 64e, two and one half revolutions between the first pin 62a and sixth pin 64f, two and one half revolutions between the second pin 62b and seventh pin 64g, and two and one half revolutions between pin 52 and eighth pin 64h. Similar bracing 68 is formed on the opposite side of snowshoe 10 extending between pins 54, 58, 62, and 64. It should be appreciated that due to the upward curvature of sides 24 and 26, the longitudinal bracing extending between pins 64c and 64e and pins 56 and 58 extends in an elevated position from the plane of sides 20 and 22 of central portion 14 and top surface 40 of jig 38.

Next cross bracing 70 may be provided across jig 38 between pins 64f on opposite sides 24 and 26 of tip portion 12. Like cross bracing 72 may be provided between pins 48 and 50 on opposite sides 20 and 22 and the next two pins 60a and 60b on the opposite sides 20 and 22 of central portion 14. Cross bracings 70 and 72 extend over longitudinal bracing 68 drawing it towards but without engaging top surface 40 of jig 38. This arrangement of bracings 70 and 72 extending over bracing 68 provides a spring or cushion effect. In the most preferred form, bracing 70 and 72 are formed by weaving three revolutions over each of the respective pins 64 f, 48, 50, and 60.

Strands 36 may then again be weaved around the perimeter of jig 38 over and under pins 46, 48, 50, 52, 54, 56, 58, 60, 62, and 64 two revolutions to interlock bracing 68 and 70 to the prior woven strands 36. It can then be appreciated that with two revolutions, one revolution will go over any particular pin 46, 48, 50, 52, 54, 56, 58, 60, 62, or 64 and the other revolution will then go under that particular pin 46, 48, 50, 52, 54, 56, 58, 60, 62, or 64.

Diagonal or body bracing 74 may then be provided woven across jig 38 between pin 64a of side 24 to pin 64c of side 26, and similarly between pins 64b&c of side 24 and pins 64d&e of side 26. Diagonal or body bracing 76 may be provided woven between pin 48 to the third pin 60c of side 22 and similarly between successive pins 60 on opposite sides 20 and 22 the remaining length of snowshoe 10 to and including pin 52 and pin 58. Diagonal or body bracing 78 may then be provided woven between pin 64a of side 26 to pin 64c of side 24 and similarly between pins 64b&c of side 26 and pins 64d&e of side 24. Diagonal or body bracing 80 may be provided woven between pin 50 to the third pin 60c, of side 20 and similarly between successive pins 60 on opposite sides 20 and 22 the remaining length of snowshoe to and including pin 54 and pin 56.

After bracing 74, 76, 78, and 80 have been woven in place, strands 36 may then again be weaved around the perimeter of jig 38 over and under pins 46, 48, 50, 52, 54, 56, 58, 60, 62, and 64 two revolutions to interlock bracing 74, 76, 78 and 80 to the prior woven strands 36. It can then be appreciated that with two revolutions, one revolution will go over any particular pin 46, 48, 50, 52, 54, 56, 58, 60, 62, or 64 and the other revolution will then go under that particular pin 46, 48, 50, 52, 54, 56, 58, 60, 62, or 64.

Lateral bracing 82 may then be woven across jig 38 between pins 56 and 58, between pins 62 on opposite sides 30 and 32, between pins 52 and 54, between pins 60 on opposite sides 20 and 22, between pins 46 and 50, and between pins 64b–f on opposite sides 24 and 26. In the most preferred form, one revolution of strands 36 is provided around each set of pins except for around pins 48 and 50 and the first two sets of pins 60 of central portion 14 which each receive three revolutions.

Strands 36 may then be woven as filler bracing across jig 38 three revolutions to overlay the bracing 68 and sides 20 and 22 between pins 64e and pins 52 and 54, two revolutions between pins 64f and pins 60k and one revolution between pins 64g, 64h, 48 and 50 and pins 60j, 60i, and 60h.

Strands 36 may then again be weaved around the perimeter of jig 38 over and under pins 46, 48, 50, 52, 54, 56, 58, 60, 62, and 64 two revolutions to interlock the prior woven strands 36 together. It can then be appreciated that with two revolutions, one revolution will go over any particular pin 46, 48, 50, 52, 54, 56, 58, 60, 62, or 64 and the other revolution will then go under that particular pin 46, 48, 50, 52, 54, 56, 58, 60, 62, or 64.

Strands 36 may then be woven across jig 38 to form criss cross weaves 84. Specifically, in the most preferred form, strands 36 are woven from pin 64b of side 24 to pin 64d of side 26, to pin 64d of side 24, to pin 64f of side 26, to pin 64f of side 24, to pin 48, to pin 60c of side 22, to pin 60c of side 20, to pin 60e of side 22, to pin 60e, of side 20, to pin 60g of side 22, to pin 60g of side 20, to pin 60i of side 22, to pin 60i of side 20, to pin 60k of side 22, to pin 60k of side 20, to pin 62b of side 32, to pin 62b of side 30, to pin 58 and to pin 56. Strands 36 may then be cut a short distance from pin 56 and the full end wrapped around pin 56.

It should then be noted a toe aperture 96 is formed and defined by strands 36 extending across pins 64f of sides 24 and 26 and across pins 48 and 50 and between bracing 68. Specifically, this area is not crossed by strands 36. Further, it should be appreciated that aperture 96 is reinforced by the multiple revolutions extending between pins 64f, 48, and 50 such that tearing of aperture 96 does not occur into webbing 92.

A spacer bar 86 may then be placed to insure that a spacing is provided between strands 36 extending between pins 48 and 50, between pins 60a on opposite sides 20 and 22, and between bracing 68 for receipt of a suitable binding 90 such as of the type shown in Pat. No. D272,937, which is hereby incorporated herein by reference. An indentation bar 88 may then be provided to overlie strands 36 located intermediate bracing 68 and generally between pins 48 and 50 and pins 60b to form a flat depression where the boot of the user will abut snowshoe 10. Thereafter, jig 38 including strands 36 woven thereon and bars 86 and 88 may then be heated to cure i.e. catalyze the resins to harden and integrally form strands 36 together wherever strands 36 abut together. To create a cleaner looking product, the loose fiberglass strands may be cleaned with an open flame under pressure to create a heat that melts the loose fiberglass strands but at the same time does not ignite the polyester resin. Thereafter, bars 86 and 88 may be removed from atop snowshoe 10 and then snowshoe 10 may be removed from jig 38 after pins 46, 48, 50, 52, 54, 56, 58, 60, 62, 64, and 66 are removed. Thereafter, binding 90 may be attached to snowshoe 10 to allow its attachment to the boot of the user.

Now that the basic construction and method of manufacture of snowshoe 10 have been explained, the subtle features and advantages of snowshoe 10 and its method of manufacture can now be set forth and appreciated. For example, according to the preferred form, two strands 36 of fiberglass roving are utilized to provide sufficient strength and particularly 240 yards of roving make one pound weight for each of strands 36 utilized in the preferred form. Further, in the preferred form, strands 36 utilized are less hairy and not as thick and heavy as plain common gun roving and are of two different colors such that when woven together, a wood looking grain is obtained for snowshoe 10.

Strands 36 are impregnated with a color fast resin which sets up or hardens around the fiberglass roving when subjected to heat for a predetermined time for bonding strands 36 into a single impervious rigid strand. For ease of removal of snowshoe 10 from jig 38 and removal of pins 46, 48, 50, 52, 54, 56, 58, 60, 62, 64, and 66 from jig 38 and snowshoe 10, a polyester resin is utilized in the preferred form of the present invention. Further, the polyester resin includes a surfacing agent which is a gell coat that comes to the surface and seals, includes a perfume to reduce odors, includes an ultraviolet light stabilizer, and is extremely durable.

It should further be appreciated that due to the multiple weaving and braiding of strands 36 around jig 38 tying strands 36 together, the resin in strands 36 woven around pins 46, 48, 50, 52, 54, 56, 58, 60, 62, 64, and 66 of jig 38 when subjected to heat for a predetermined time bonds strands 36 which engage each other into a single, homogenous, impervious, rigid mass. Thus, snowshoe 10 is formed according to the teachings of the present invention as a single integral piece.

Jig 38 is believed to be particularly advantageous according to the teachings of the present invention. Specifically, jig 38 is formed of high density polyethylene which which may be heat treated to form the toe and curvature. Thus, it is possible to make a semi-reproduction of the curvatures of traditional wood rawhide snowshoes. Further, pins 46, 48, 50, 52, 54, 56, 58, 60, 62, 64, and 66 extend from side surface 42 generally horizontally or parallel to top surface 40 and spaced vertically below top surface 40. In this form, frame portion 18 of snowshoe 10 is formed by strands 36 located adjacent side surface 42 of jig 38 as they extend around pins 46, 48, 50, 52, 54, 56, 58, 60, 62, 64, and 66 while webbing 92 is formed by strands 36 located on top of top surface 40 of jig 38. Thus, webbing 92 is located on the top surface of frame portion 18 of snowshoe 10 and is spaced above the bottom of frame portion 18 of snowshoe 10. Therefore, webbing 92 is allowed to stretch into the interior of frame portion 18 to provide a cushion or shock absorber effect for the legs of the user. Further, bracing 68 running generally parallel to the longitudinal axis of frame portion 18 is permitted to be formed on jig 38. Bracing 68 provides additional strength for frame portion 18 to allow reduction in the amount of braiding used to form frame portion 18 to thus reduce the overall weight of snowshoe 10 while still preventing breakage.

It should further be noted that bracing 68 and bracing 70 and 72 and later strands 36 overlying the same are further advantageous according to the teachings with the present invention. Specifically, the cushion or shock absorber effect of snowshoe 10 of webbing 92 is enhanced by bracing 68 being tensioned downwardly by bracing 70 and 72 as generally set forth previously in addition to the cushion effect produced by webbing 92 being located adjacent the top surface of frame portion 18.

Further unique cleats 94 are permitted to be formed on jig 38 according to the preferred teachings of the present invention. Specifically, initially strands 36 are woven around pins 66 forming V-shaped depressions. However after these initial weavings, strands 36 woven around pins 46, 48, 50, 52, 54, 56, 58, 60, 62, and 64 and forming frame portion 18 do not extend around pins 66 to close the top of the V-shaped depressions and form triangular shaped cleats 94. After curing such that strands 36 form a single homeogenous, impervious, rigid mass, cleats 94 are integrally formed having great strength. Cleats 94 provide non slip traction on hill ascents and descents and like travel surfaces.

It should further be noted that snowshoe 10 has a unique configuration according to the teachings of the present invention. Specifically, the length of snowshoe 10 has been reduced to reduce the overall weight. In this regard, the rear portion 16 terminates in lateral extending side 34 rather than an arcuate or tail portion. Thus, the spacing between sides 20, 22, 30, and 32 can be maximized by keeping them generally parallel to each other to maximize the contact area of webbing 92 therebetween. Further, the slight angle of sides 30 and 32 allows the generally parallel placement of bracing 68 with sides 20 and 22 while maximizing spacing between sides 30 and 32.

It can then be appreciated that snowshoe 10 according to the preferred teachings of the present invention are formed of fiberglass which requires no maintenance opposed to that required for traditional wood and rawhide snowshoes and are practically indestructible as opposed to plastic snowshoes. Further snowshoes 10 are light weight, and extremely durable to the point of being indestructible under normal conditions. In fact, snowshoes 10 according to the teachings of the present invention can be used year round including summer training on golf courses. Such uses are advangateous in non snow conditions for providing an extra cushion for the foot such as for coming off an injury and for specialized workouts for specific races run over a very hilly or mountain terrain.

Now that the basic teachings of the present invention have been explained, many extension and variations will be obvious to one having ordinary skill in the art. For example, although the present invention has been explained according to the most preferred form relating to a recreational type snowshoe 10 of a preferred configuration, it can be appreciated that the teachings of the present invention can be utilized with other configurations such as Alaskan trail snowshoe configurations.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Method of forming a snowshoe comprising the steps of: providing a jig having a peripheral surface and having a first series of spaced-apart strand supporting pins projecting outwardly of the peripheral surface; providing at least a first continuous strand of fiberglass roving impregnated with resin; weaving the continuous strand between said pins around the peripheral surface and between said pins across the jig to form a frame and webbing for the snowshoe; allowing the resin to set to form the woven strand into a single homogenous, rigid mass; and removing the rigid mass from the jig.

2. The method of claim 1 further comprising the step of providing a second continuous strand of fiberglass roving impregnated with resin; and wherein the weaving step comprises the step of double weaving the first and second continuous strands.

3. The method of claim 2 wherein the step of providing a second continuous strand of fiberglass roving impregnated with resin comprises the step of providing a second continuous strand of fiberglass roving of a color different from the first continuous strand of fiberglass roving.

4. The method of claim 1 wherein the step of providing a jig comprises the step of providing a jig having a first series of removable spaced-apart strand supporting pins projecting horizontally outwardly from the peripheral surface at a first vertical distance.

5. The method of claim 4 further comprising the step of providing a second series of removable spaced-apart strand supporting pins projecting horizontally outwardly from the peripheral surface at vertical distance greater than the first series of pins and intermediate the pins of the first series; and wherein the weaving step includes the step of weaving the strand around the second series of pins to form V-shaped depressions below the woven strand forming the frame, with the V-shaped depression and the frame forming triangular shaped cleats when the resin sets into the rigid mass.

6. The method of claim 4 wherein step of providing a jig comprises the step of providing a jig having a central portion located intermediate a tip portion and a rear portion, with each of the central portion, the tip portion, and the rear portion including first and second sides, with the first and second sides of the tip portion and the rear portion extending inwardly of the first and second sides of the central portion; and wherein the weaving step further includes the step of weaving the continuous strand between pins of the tip portion and the rear portion generally parallel to and spaced from the first and second sides of the central portion to form bracing for the frame of the snowshoe.

7. The method of claim 6 wherein the step of providing a jig comprises the step of providing a jig having the first and second sides of the tip portion extending upwardly from the first and second sides of the central portion; wherein the weaving step includes the step of weaving the continuous strand between pins of the tip portion and the rear portion generally parallel to and spaced from the first and second sides of the central portion and extending vertically above the plane of the first and second sides of the central portion; and wherein the weaving step further includes the step of weaving the continuous strand laterally over the continuous strand forming the bracing drawing it toward the plane of the first and second sides of the central portion to provide a cushion effect.

8. The method of claim 4 wherein the step of weaving the strand between said pins across the jig comprises the step of weaving the strand laterally across the jig.

9. The method of claim 8 wherein the step of weaving the strand between said pins across the jig comprises the step of weaving the strand diagonally across the jig.

10. The method of claim 9 wherein the step of weaving the strand around the peripheral surface comprises the step of weaving the strand over and under the pins in consecutive revolutions around the peripheral surface.

11. The method of claim 7 wherein the step of providing a jig comprises the step of providing a jig having the first and second sides of the rear portion terminate in a laterally extending rear side.

12. The method of claim 1 further comprising the step of overlying the strands forming the webbing with an indentation bar prior to the step of allowing the resin to set to form a flat depression for abutment by the boot of the user when the snowshoe is worn.

13. The method of claim 12 further comprising the step of spacing the strand forming the webbing prior to the step of allowing the resin to set to form a slot for receiving a binding for the snowshoe.

* * * * *